O. LAURENZ.
MILLING CUTTER.
APPLICATION FILED APR. 22, 1918.
1,319,714.
Patented Oct. 28, 1919.
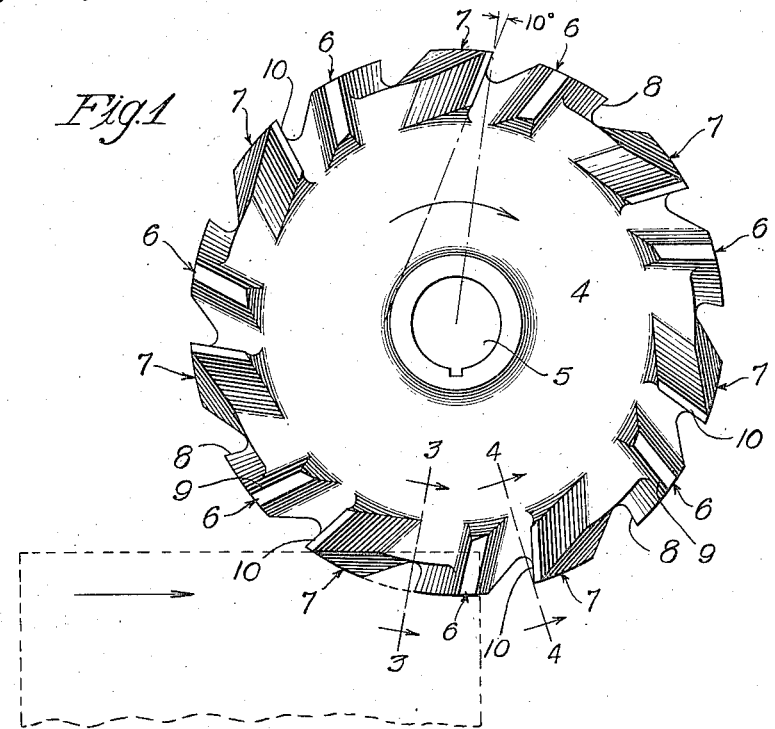
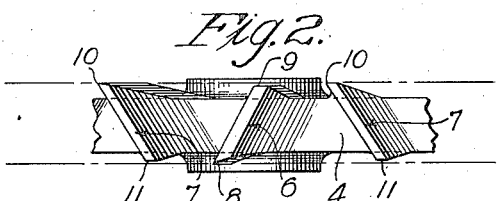
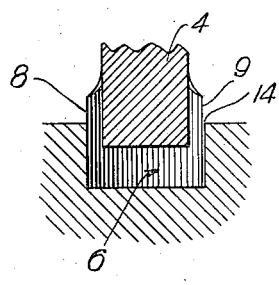
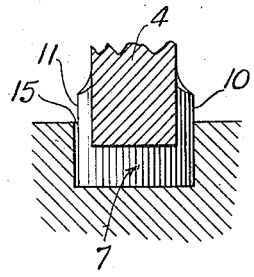
Inventor
Otto Laurenz
by J. E. Roberts
Atty.

UNITED STATES PATENT OFFICE.

OTTO LAURENZ, OF CHICAGO, ILLINOIS, ASSIGNOR TO WESTERN ELECTRIC COMPANY, INCORPORATED, OF NEW YORK, N. Y., A CORPORATION OF NEW YORK.

MILLING-CUTTER.

1,319,714.  Specification of Letters Patent.  Patented Oct. 28, 1919.

Application filed April 22, 1918. Serial No. 230,194.

*To all whom it may concern:*

Be it known that I, OTTO LAURENZ, a citizen of the United States, residing at Chicago, in the county of Cook and State of Illinois, have invented certain new and useful Improvements in Milling-Cutters, of which the following is a full, clear, concise, and exact description.

This invention relates to milling cutters, and more particularly to a side tooth milling cutter for cutting slots in metal bodies.

The object of this invention in general is to provide a milling cutter which is capable of operating upon stock moving at a high speed, to cut a clean, deep slot, without chattering or vibrating.

In accordance with one feature of this invention, a milling cutter is provided in which the teeth are located in a staggered angle relation with respect to each other, and each tooth is provided with a cutting edge upon one side only. Adjacent teeth are staggered in opposite directions and each is provided with a cutting edge upon its advancing side, the opposite side being provided with a cleaning edge.

In accordance with another feature of this invention the teeth of the cutter are so constructed that the action thereof upon the stock is wholly a shearing one free from a scraping or dragging effect. This is provided for by sloping the front face of each tooth backwardly from the cutting edge.

In the drawings—

Figure 1 is a view in side elevation of a milling cutter embodying the features of this invention;

Fig. 2 is a view looking toward the peripheral edge of the device;

Fig. 3 is a detailed sectional view taken upon the line 3—3 of Fig. 1, and

Fig. 4 is a detailed sectional view taken upon the line 4—4 of Fig. 1.

As shown in the drawings, 4 designates a cylindrical body portion of a milling cutter provided with a centrally located opening 5, by means of which it may be secured to a mandrel. The reference numerals 6 and 7 designate the cutting teeth of the device. As will be noted from the drawing, the teeth 6 are each staggered in one direction, and the teeth 7 are staggered in the opposite direction. Each tooth 6 is provided on one side, which is the advance side of the tooth as the cutter is rotated in the direction indicated by the arrow, with a cutting edge 8 and upon its opposite side with a cleaning edge 9. Likewise each tooth 7 is provided upon its advancing side with a cutting edge 10 and upon its opposite side with a cleaning edge 11. Each tooth 6 is adjacent to a tooth 7 so that the cutting operation upon one side of the slot will be performed by the tooth 6 while that upon the other side of the slot will be performed by the tooth 7. The several teeth which operate upon the same side of the slot are sufficiently close together to insure a deep and clean cut, while the clearance between adjacent teeth, due to the staggered angle relation between them, is sufficient to permit the metal chips resulting from the cut to be readily carried away without clogging the action of the succeeding teeth or requiring any scraping action to remove the loose metal other than that performed by the teeth in the cutting operation.

The cleaning edges 9 and 11 are cut away sufficiently to provide a slight clearance between these edges and the side wall of the slot which is being cut. This is illustrated in Figs. 3 and 4, in which the reference characters 14 and 15 designate the clearance spaces upon opposite sides of the cut.

The front surface of each tooth is preferably cut at an angle of about 10 to 15 degrees with respect to a radial line of the cutter, while the back surface of the tooth is cut at an angle of about 45 degrees, which insures sufficient clearance space without weakening the teeth. The sloping of the front face of each tooth insures that its action upon the metal will be wholly a shearing one free from scraping or dragging.

With a cutter of this type each tooth is an active cutting tooth, and due to the staggered angle relation between adjacent teeth, the clearance space provided thereby, and the shearing action of each tooth due to its sloping front face, a cutter of this description is capable of cutting a deep, clean slot or groove through hard metal stock which is being fed to it at a high rate of speed.

What is claimed is:

1. A milling cutter comprising a cylindrical body portion provided on its peripheral edge with a plurality of teeth, adjacent ones of which are inclined or staggered in opposite directions and each tooth of which is provided with a cutting edge on one side only, the cutting edges of adjacent teeth being at opposite sides of the cutter.

2. A milling cutter comprising a cylindrical body portion provided on its peripheral edge with a plurality of teeth, adjacent ones of which are staggered in opposite directions, each tooth being provided at one side only with a cutting edge and at its other side with a cleaning edge, the cutting edges of adjacent teeth being upon opposite sides of the cutter.

3. A milling cutter comprising a cylindrical body portion provided upon its peripheral edge with a plurality of cutting teeth staggered in opposite directions, each tooth being provided on one side only with a cutting edge and upon its opposite side with a cleaning edge, the cutting edges of adjacent teeth being upon opposite sides of the cutter and the cleaning edges of the teeth being cut down beyond the line of travel of the cutting edge of the adjacent teeth to provide a clearance between the cleaning edge and the side wall of the surface cut.

In witness whereof, I hereunto subscribe my name this eighth day of April A. D., 1918.

OTTO LAURENZ.